(12) United States Patent
De Kock

(10) Patent No.: US 10,830,304 B2
(45) Date of Patent: Nov. 10, 2020

(54) FREQUENCY-SELECTIVE DAMPER VALVE, AND SHOCK ABSORBER AND PISTON HAVING SUCH VALVE

(71) Applicant: Koni B.V, Oud-Beijerland (NL)

(72) Inventor: Paul De Kock, Numansdorp (NL)

(73) Assignee: Koni B.V, Oud-Beijerland (NL)

(*) Notice: Subject to any disclaimer, the term of this patent is extended or adjusted under 35 U.S.C. 154(b) by 239 days.

(21) Appl. No.: 15/779,423

(22) PCT Filed: Nov. 28, 2016

(86) PCT No.: PCT/EP2016/079053
§ 371 (c)(1),
(2) Date: May 25, 2018

(87) PCT Pub. No.: WO2017/089621
PCT Pub. Date: Jun. 1, 2017

(65) Prior Publication Data
US 2018/0335105 A1    Nov. 22, 2018

(30) Foreign Application Priority Data

Nov. 27, 2015   (NL) .................................... 2015876

(51) Int. Cl.
*F16F 9/512*   (2006.01)
*F16F 9/348*   (2006.01)
(Continued)

(52) U.S. Cl.
CPC .............. *F16F 9/5126* (2013.01); *F16F 9/34* (2013.01); *F16F 9/3482* (2013.01);
(Continued)

(58) Field of Classification Search
CPC .......... F16F 9/5126; F16F 9/34; F16F 9/3482; F16F 9/362; F16F 9/16
See application file for complete search history.

(56) References Cited

U.S. PATENT DOCUMENTS

2005/0045440 A1* 3/2005 Kock ..................... F16F 9/512
188/322.15
2005/0056506 A1  3/2005 Deferme
(Continued)

FOREIGN PATENT DOCUMENTS

DE        10321351 A1   12/2004
DE    102013111502 A1    4/2015
(Continued)

OTHER PUBLICATIONS

International Search Report, dated Jan. 10, 2017, from corresponding PCT Application No. PCT/EP2016/079053.

*Primary Examiner* — Melanie Torres Williams
(74) *Attorney, Agent, or Firm* — Hertzberg, Turk & Associates, LLC

(57) ABSTRACT

A frequency-selective damper valve includes a controlled flow channel providing a fluid connection between a first and second valve sides; a controlled valve assembly in a controlled flow channel; a movable valve body acting on the controlled valve assembly; and a variable volume chamber, the movable valve body interacting with the variable volume chamber such that movement of the movable valve body and a change in volume of the variable volume chamber are interrelated. The variable volume chamber includes an outlet opening, in operation, downstream of the controlled valve assembly and does not include an opening upstream of the controlled valve assembly with respect to a controlled fluid flow in the controlled flow channel, the outlet opening providing a flow resistance.

36 Claims, 9 Drawing Sheets

(51) Int. Cl.
*F16F 9/34* (2006.01)
*F16F 9/36* (2006.01)
*F16F 9/16* (2006.01)

(52) U.S. Cl.
CPC ............ *F16F 9/3485* (2013.01); *F16F 9/362* (2013.01); *F16F 9/16* (2013.01)

(56) References Cited

U.S. PATENT DOCUMENTS

| | | | |
|---|---|---|---|
| 2013/0164131 A1* | 6/2013 | Russell | B64C 27/51 416/1 |
| 2015/0152936 A1 | 6/2015 | Kim | |
| 2015/0345586 A1* | 12/2015 | de Kock | F16F 9/18 188/313 |
| 2016/0025180 A1 | 1/2016 | Fukushima et al. | |

FOREIGN PATENT DOCUMENTS

| | | |
|---|---|---|
| EP | 2108858 A2 | 10/2009 |
| WO | 2014157041 A1 | 10/2014 |

\* cited by examiner

FREQUENCY-SELECTIVE DAMPER VALVE, AND SHOCK ABSORBER AND PISTON HAVING SUCH VALVE

FIELD OF THE INVENTION

The invention relates to a frequency-selective damper valve having a controlled flow channel and a controlled valve assembly provided in the controlled flow channel.

BACKGROUND OF THE INVENTION

Dampers, or shock absorbers, are well known and widely applied in, for instance, a variety of vehicles like cars, truck, buses and trains. The dampers are designed to provide a desired damping behavior between parts moving with respect to one another. Damping can be chosen to be stiff or soft by the specific design of the damper. More advanced dampers have been proposed, which provide a frequency-selective damping behavior to the damper. A frequency-selective damping valve can be added to the damper to provide a desired frequency-selective damping behavior. Such frequency-selective damping valve can be added to or incorporated into known damper configurations to provide additional frequency selectivity. On the other hand, such frequency-selective dampers can also be employed in their own right in certain applications that require frequency selective damping of a fluid flow between two (pressure) chambers.

A pressure or control chamber can be employed in frequency selective valves and dampers having such type of valve incorporated. Upon a fluid flow in the valve which is to be damped so as to provide the damping behavior, a part of the fluid flow can be branched off to increase a pressure inside the pressure or control chamber. An increase in pressure inside the control chamber then acts to increase a closing force on a controlled valve provided in the flow channel for the fluid flow that is to be damped. The closing force of the controlled valve controls the momentary damping behavior.

One likes to have a predetermined increase of the closing force as a function of time, such as, for instance, a proportional relation between closing force and time. However, a desired relation between closing force and time is not easily obtained, if at all, in the presently known configurations of frequency selective valves. The increase in closing force generally shows a strong non-linear dependence on the pressure increase in the control chamber and therefore a strong non-linear dependence of time. One would like to have various parameters available to tune the closing force as a function of pressure inside the control chamber and thus as a function of time.

A pressure increases in time inside the control chamber to control the closing force of the controlled valve so as to provide frequency selective damping in the known frequency-selective dampers. However, for the known configurations the pressure inside the control chamber does not go back again to a neutral level for a next fluid flow to be damped, such as during a next stroke of a piston in its cylinder, which is to be damped. Having the control chamber pressure maintained at some level above neutral strongly deteriorates the performance of the frequency selective valve. The known configurations are further suited to act in one direction only. It requires two known configurations to obtain frequency-selective damping in opposite directions, which requires relatively a large amount of space. In itself, a one-directional known frequency selective damping valve already requires quite some space, which may make application of such valve difficult.

The presently known configurations further may show a strong dependence of individually manufactured valves on manufacturing tolerances. There is a need for a frequency selective valve configurations that is very robust to manufacturing tolerances so that any desired damping behavior will actually be achieved in any valve produced.

US 2005/056506 A1 discloses a shock absorber with a piston assembly that divides the cylinder of the shock absorber in upper and lower working chambers. An additional housing is attached to the piston rod, which defines a pressure chamber within which is slidably disposed a further piston to define upper and lower fluid chambers in fluid communication with the upper and lower working chamber of the shock absorber cylinder, respectively. Fluid can enter one of the upper and lower fluid chambers within the pressure chamber to pressurize that chamber which causes fluid to be urged out of the other fluid chamber by movement of the further piston. The further piston prevents fluid from flowing in between both fluid chambers, and thus between both sides of the piston assembly.

EP 2 108 858 A2 discloses a shock absorber with a piston having a two-member housing. A first member of the housing is intended to move along a cylinder wall of the cylinder of the shock absorber with a seal in between. The first housing member is hollow with an open bottom end that is closed by a second member, or cover.

SUMMARY OF THE INVENTION

At least one of the disadvantages of the known frequency-selective damper valves is overcome and/or further improvements and/or further advantages is achieved by a frequency-selective damper valve comprising a controlled flow channel arranged to provide a fluid connection between a first damper valve side and a second damper valve side of the damper valve;

a controlled valve assembly provided in the controlled flow channel to allow, in operation, influencing a controlled fluid flow in the controlled flow channel in a controlled flow direction from the first damper valve side to the second damper valve side;

a movable valve body being movable with respect to a wall of the controlled flow channel and acting on the controlled valve assembly to allow changing a flow resistance for the controlled fluid flow by the controlled valve assembly; and a variable volume chamber, the movable valve body interacting with the variable volume chamber such that movement of the movable valve body and a change in volume of the variable volume chamber are interrelated, wherein the variable volume chamber comprises an outlet opening, in operation, downstream of the controlled valve assembly and does not comprise an opening upstream of the controlled valve assembly with respect to the controlled fluid flow in the controlled flow channel, the outlet opening providing a flow resistance, and a fluid pressure upstream of the controlled valve assembly with respect to the controlled fluid flow acting on the movable valve body to induce a force on the movable valve member in a direction to increase a fluid pressure in the variable volume chamber and to decrease a volume of the variable volume chamber by fluid flow from the variable volume chamber through the outlet opening, which allows an interrelated movement of the movable valve body.

The damper valve of the invention can readily be implemented such as to act in opposite directions. It further allows to provide for a well-defined relation of fluid flow and pressure with regard to closing position and closing velocity of the damper valve. Performance is very robust and very independent of manufacturing tolerances. The design is very simple and allows implementation in a very limited amount of space.

In an embodiment the controlled valve assembly is configured such that at least one of an effective opening and a closing force of the controlled valve assembly is changed upon movement of the movable valve body to change the flow resistance for the controlled fluid flow by the controlled valve assembly.

In an embodiment the controlled valve assembly is configured such that the flow resistance for the controlled fluid flow by the controlled valve assembly increases with decreasing volume of the variable volume chamber.

In an embodiment the controlled valve assembly is configured to have spring-like behaviour and to exert a force on the movable valve body in a direction to move the movable valve body back to a neutral position when the movable valve body has moved from the neutral position. Especially such embodiment allows to effectively provide an equilibrium position at a range of fluid pressures upstream of the controlled valve at a closed configuration of the controlled valve assembly. The controlled valve assembly will open again at a further pressure increase.

In an embodiment the controlled valve assembly comprises a controlled valve plate, optionally a ring-shaped controlled valve plate.

In an embodiment the controlled valve plate comprises opposing edges, optionally opposing internal and external perimeters of a ring-shaped controlled valve plate, one or both opposing edges being restricted in movement with respect to one or both of a wall of the controlled flow channel and the movable valve body, optionally one or both opposing edges being clamped by one or both of a wall of the controlled flow channel and the movable valve body.

In an embodiment the controlled valve assembly comprises a stack of at least one controlled valve plate interacting with at least one surface presenting a curvature upon movement of the movable valve body with decreasing volume of the variable volume chamber, and the (stack of at least one) controlled valve plate upon deformation conforms to the curvature to gradually decrease an effective surface area of the controlled valve plate in the controlled flow channel.

In an embodiment the stack of at least one controlled valve plate comprises at least one opening.

In an embodiment the stack of the at least one controlled valve plate comprises at least one opening positioned and configured to gradually close against the at least one curved surface upon movement of the movable valve body with decreasing volume of the variable volume chamber.

In an embodiment the movable valve body comprises a surface presenting a curvature interacting with the controlled valve plate.

In an embodiment the movable valve body comprises first and second movable valve body members, and the controlled valve plate is clamped between the first and second movable valve body members, optionally at least one of the first and second movable valve members comprising a surface presenting a curvature interacting with the controlled valve plate.

In an embodiment the wall of the controlled flow channel comprises a surface presenting a curvature interacting with the first valve plate.

In an embodiment the controlled valve assembly comprises a stack of at least one controlled valve plate closing against a valve seat and of which a closing force against the valve seat changes upon movement of the movable valve body, optionally the valve seat being provided on the movable valve body and the stack of at least one controlled valve plate being fixed with respect to the wall of the controlled flow channel.

In an embodiment the controlled valve assembly is bidirectional acting for first and second flows in opposite directions in the controlled flow channel, and comprises first and second controlled valve plates associated with the first and second flows, respectively, each of the first and second controlled valve plates closing against a respective valve seat and of which a closing force against the respective valve seat changes upon movement of the movable valve body, optionally the respective valve seats being provided on the movable valve body and the first and second controlled valve plates being fixed with respect to the wall of the controlled flow channel.

In an embodiment the controlled valve assembly comprises a third controlled valve plate configured to have spring-like behaviour and to exert a force on the movable valve body in a direction to move the movable valve body back to a neutral position when the movable valve body has moved from the neutral position, optionally the third controlled valve plate being arranged in between the first and second controlled valve plates.

In an embodiment the variable volume chamber comprises a non-return valve associated with an opening of the variable volume chamber downstream of the controlled valve assembly, the non-return valve being configured to be closed upon the controlled fluid flow and opening at a fluid flow in a direction opposite to the controlled fluid flow.

In another aspect the invention provides for a shock absorber comprising a above damper valve referred to above.

In an embodiment the shock absorber further comprises
a cylinder having a cylinder wall;
a piston sealing against the cylinder wall and dividing the cylinder in first and second cylinder chambers, the piston being movable within the cylinder along the cylinder wall and along a longitudinal direction of the piston and the cylinder in inward and outward directions upon inward and outward movement, respectively, of the piston inside the cylinder, a first side of the piston being associated with the first cylinder chamber and a second side of the piston being associated with the second cylinder chamber;
a first main channel and a first main non-return valve associated with the first main channel such that the first main channel and first main valve allow and damp a first main fluid flow from the second to the first cylinder chamber; and
a second main channel and a second main non-return valve associated with the second main channel such that the second main channel and second main valve allow and damp a second main fluid flow from the first to the second cylinder chamber,
wherein the first damper valve side is in direct fluid connection with one of the first and second cylinder chambers, and the second damper valve side is in direct fluid connection with the other one of the first and second cylinder chambers, optionally the damper valve being arranged in the piston. A side of the piston being associated with one of the cylinder chambers is intended to mean that said side of the piston is in contact with said cylinder chamber. A valve being associated with a channel is intended to mean that said valve will influence a fluid flow in said channel. A side of one member being associated with a side of another member is intended to mean that said side of said one member and said side of said other member are corresponding sides substantially directed in a same direction, for instance, both being top sides that are directed upwards or both being bottom sides that are directed downwards. A direct fluid connection is intended to be understood as a fluid connection in which fluid can freely flow without obstruction by a valve.

In an embodiment the damper valve is arranged in the piston and the piston comprises
- a ring-shaped connecting member;
- a first central member received in the connecting member at a first side of the connecting member, which is transverse to the longitudinal direction of the piston and associated with the first side of the piston, a first central member channel being provided on a side of the first central member, which is transverse to the longitudinal direction of the piston and associated with the second side of the piston, the first central member channel being in fluid communication with the second side of the piston; and
- a second central member received in the connecting member at a second side of the connecting member, which is transverse to the longitudinal direction of the piston and associated with the second side of the piston, a second central member channel being provided in a side of the second central member, which is transverse to the longitudinal direction of the piston and associated with the first side of the piston, the second central member channel being in fluid communication with the first side of the piston, wherein the controlled flow channel comprises the first and second central member channels and the controlled valve assembly and the movable valve body are provided in between the first and second central member channels.

The connecting member, and first and second central members are to be understood as being separate items.

In an embodiment
the connecting member comprises a part of the first main channel and a part of the second main channel, the first central member comprises another part of the first main channel such that the parts of the first main channel in the connecting member and the first central member are in line, and the second central member comprises another part of the second main channel such that the parts of the second main channel in the connecting member and the second central member are in line.

In an embodiment the connecting member is configured for movement along and sealing against the cylinder wall.

In an embodiment the first main non-return valve is provided on the first central member.

In an embodiment the second main non-return valve is provided on the second central member.

In an embodiment the part of the first main channel in the connecting member has two ends, one end being in line with the part of the first main channel in the first central member and the other end being in direct fluid connection with the second side of the piston.

In an embodiment the part of the second main channel in the connecting member has two ends, one end being in line with the part of the second main channel in the second central member and the other end being in direct fluid connection with the first side of the piston.

In an embodiment the first central member channel comprises a first central member groove provided at the side of the first central member associated with the second side of the piston.

In an embodiment the second central member channel comprises a second central member groove provided at the side of the second central member associated with the first side of the piston.

In an embodiment the first central member channel is in fluid connection with the part of the first main channel in the first central member, optionally a first auxiliary channel being provided in the first central member, which extends from the first central member channel to a side of the first central member opposing the side comprising the first central member channel, so to provide for a fluid connection between the first central member channel and the part of the first main channel in the first central member.

In an embodiment the second central member channel is in fluid connection with the part of the second main channel in the second central member, especially a second auxiliary channel being provided in the second central member, which extends from the second central member channel to a side of the second central member opposing the side comprising the second central member channel, so to provide for a fluid connection between the second central member channel and the part of the second main channel in the second central member.

In an embodiment the connecting member comprises one of a slot and projection at its internal perimeter, and at least one of the first and second central members comprises the other one of the projection and the slot at its external perimeter, the slot and projection being configured to cooperate to align the connecting member and the at least one of the first and second central members with respect to one another.

In an embodiment the connecting member and at least one of the first and second central members are fitted, optionally press-fitted, into one another such as to provide a sealing fit.

In an embodiment the piston comprises more than one first main channel, the connecting member comprising a part of each first main channel in line with another part of each first main channel comprised in the first central member.

In an embodiment the piston comprises more than one second main channel the connecting member comprising a part of each second main channel in line with another part of each second main channel comprised in the second central member.

In an embodiment the parts of the first and second main channels in the connecting member are provided alternately in the connecting member.

In an embodiment one of the first and second central members and the movable valve body provide walls of the variable volume chamber.

In yet another aspect the invention provides for a piston for use in a shock absorber referred to above, the piston comprising
- a ring-shaped connecting member;
- a first central member received in the connecting member at a first side of the connecting member, which is transverse to the longitudinal direction of the piston and associated with the first side of the piston, a first central member channel being provided on a side of the first central member, which is transverse to the longitudinal direction of the piston and associated with the second side of the piston, the first central member channel being in fluid communication with the second side of the piston; and a second central member received in the connecting member at a second side of the connecting member, which is transverse to the longitudinal direction of the piston and associated with the second side of the piston, a second central member channel being provided in a side of the second central member, which is transverse to the longitudinal direction of the piston and associated with the first side of the piston, the second central member channel being in fluid communication with the first side of the piston, and wherein the controlled flow channel comprises the first and second central member channels and the controlled valve and the movable valve body are provided in between the first and second central member channels.

In an embodiment the connecting member comprises a part of the first main channel and a part of the second main channel, the first central member comprises another part of the first main channel such that the parts of the first main channel in the connecting member and the first central member are in line, and the second central member comprises another part of the second main channel such that the parts of the second main channel in the connecting member and the second central member are in line.

BRIEF DESCRIPTION OF THE DRAWINGS

Further features and advantages of the invention will become apparent from the description of the invention by way of non-limiting and non-exclusive embodiments. These embodiments are not to be construed as limiting the scope of protection. The person skilled in the art will realize that other alternatives and equivalent embodiments of the invention can be conceived and reduced to practice without departing from the scope of the present invention. Embodiments of the invention will be described with reference to the accompanying drawings, in which like or same reference symbols denote like, same or corresponding parts, and in which.

DETAILED DESCRIPTION OF EMBODIMENTS

Figure 1:
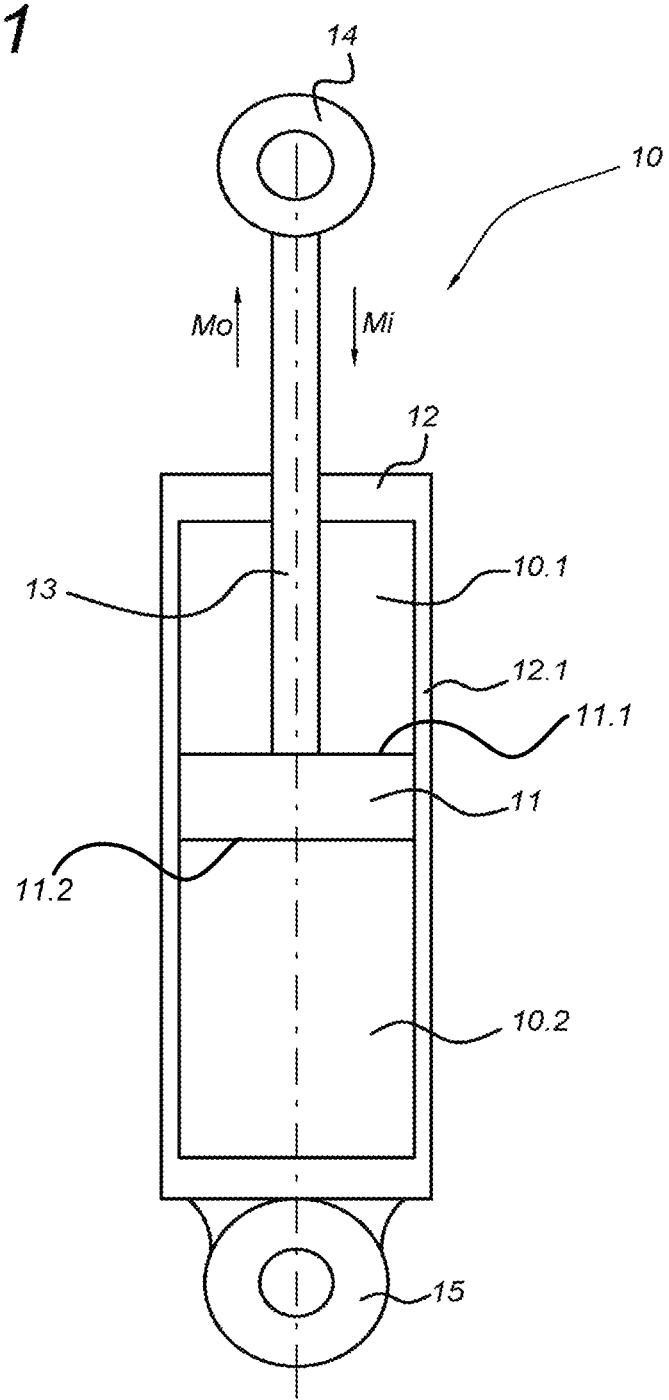
FIG. 1 shows an embodiment of a damper (shock absorber) according to the invention.

FIG. 1 schematically shows a shock absorber or damper 10 according to the invention. The damper comprises a cylinder 12 and a piston 11 that can move within the cylinder in inward and outward directions with respect to the cylinder. The direction of movement of the inward and outward strokes of the piston are indicated by the arrows labeled Mi and Mo, respectively. The piston seals against the cylindrical wall 12.1 of the cylinder and divides the cylinder in a first or upper cylinder (or damper) chamber 10.1 and a second or lower cylinder (or damper) chamber 10.2. A piston rod 13 attached to the piston 11 is in a sealing fashion guided through a top wall of the cylinder 12. The damper can be attached by its piston and cylinder attachment arrangements 14, 15 to, for instance, parts of a car to damp relative movements. Damping is achieved by influencing a fluid flow in between first and second cylinder chambers at piston movement within the cylinder by, for instance, an arrangement in the piston 11.

Figure 2:
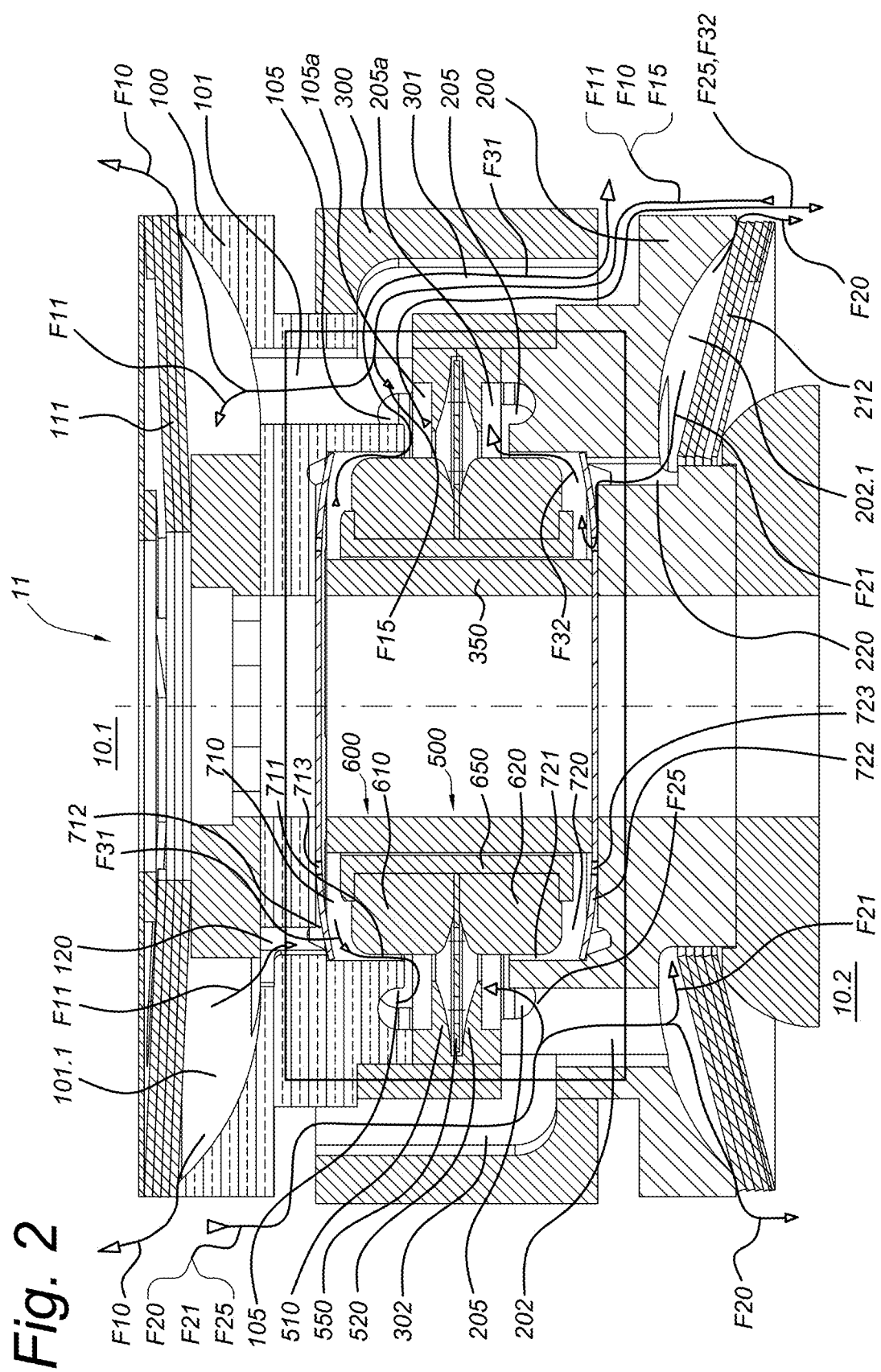
FIG. 2 shows a first embodiment of the piston of the shock absorber of FIG. 1, the piston comprising a frequency-selective damper valve according to the invention.
Figure 3:
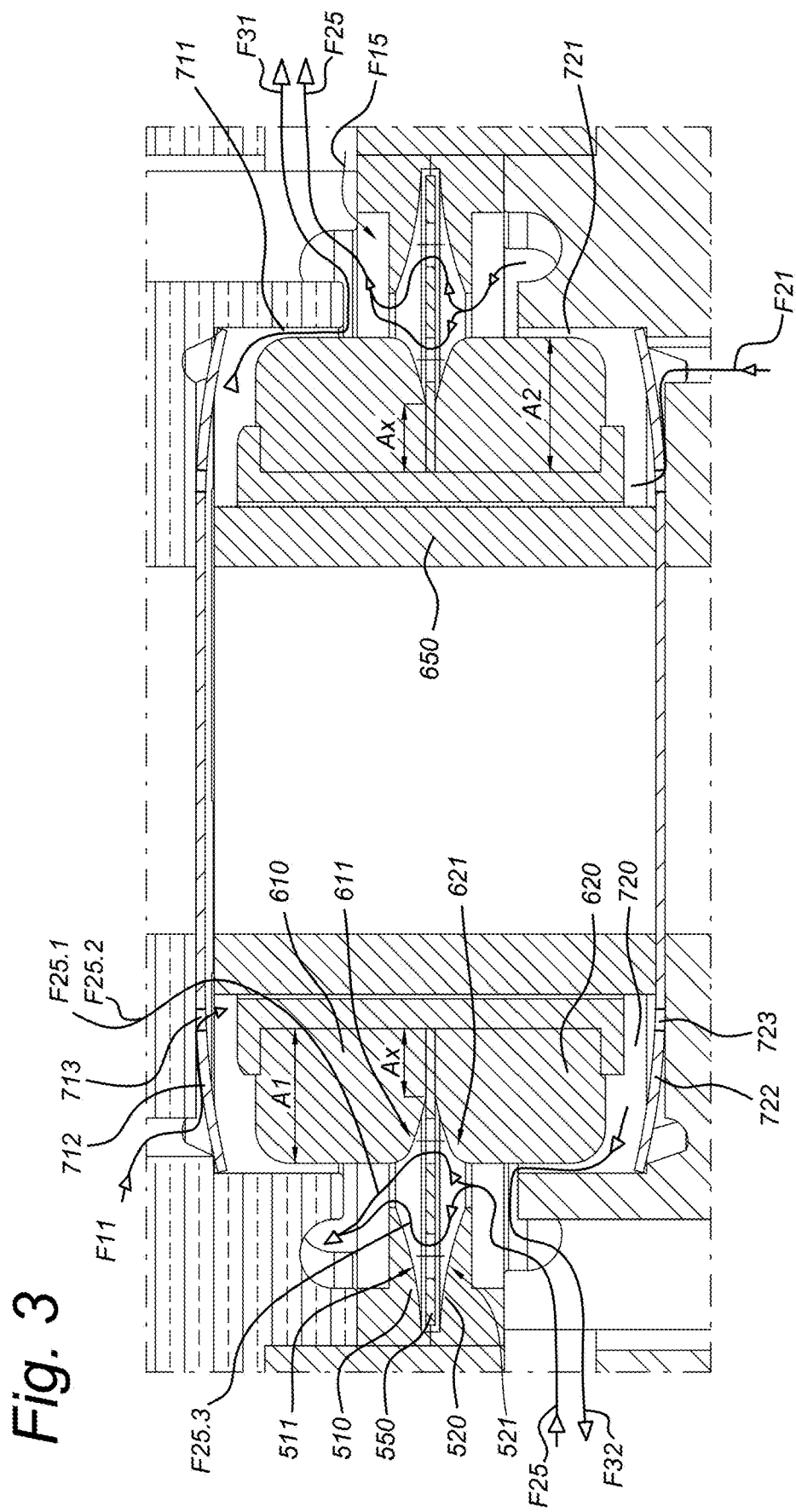
FIG. 3 shows the damper valve of FIG. 2 in more detail.
Figure 4:
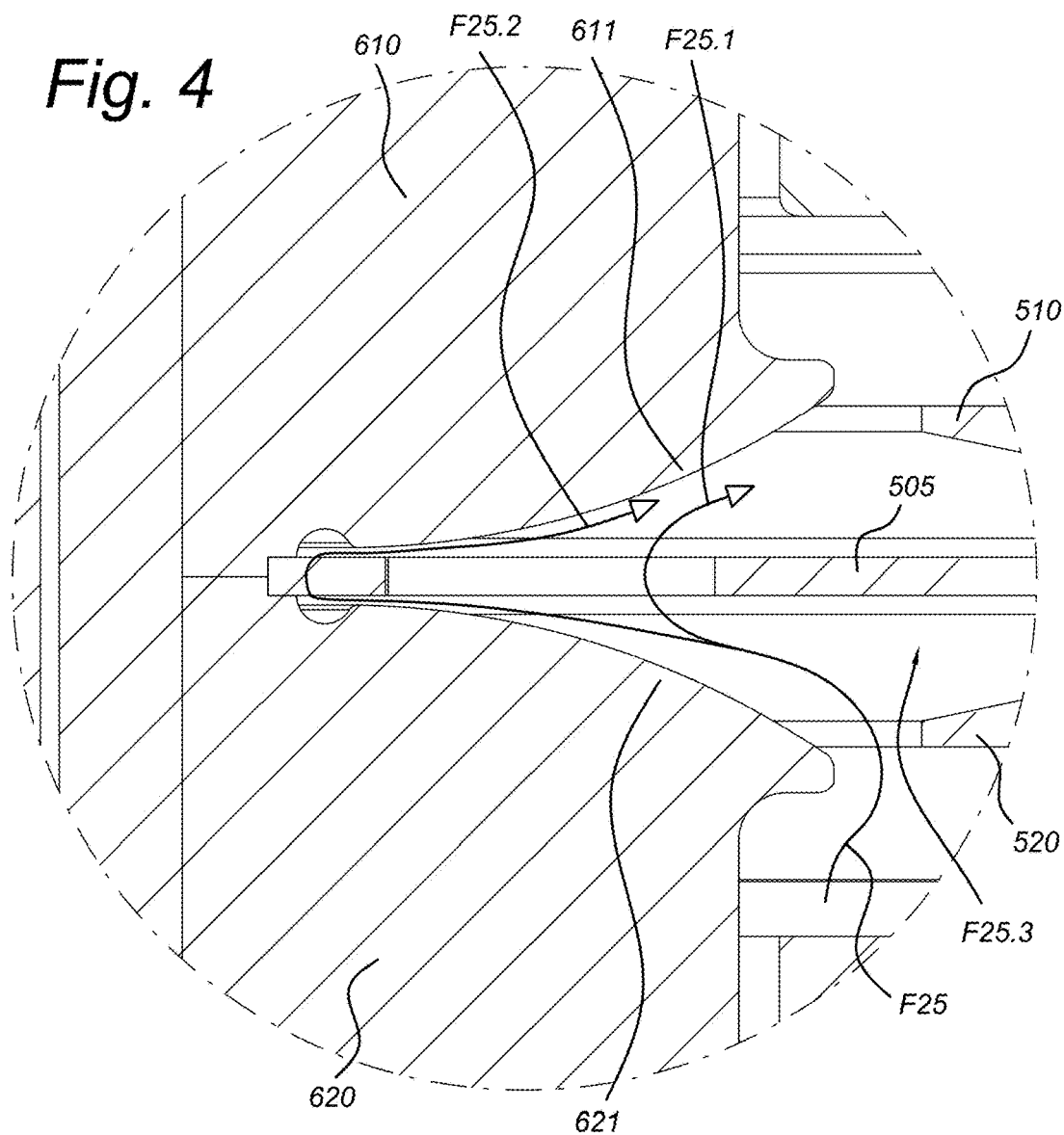
FIG. 4 shows a detail of FIG. 3.
Figure 5:
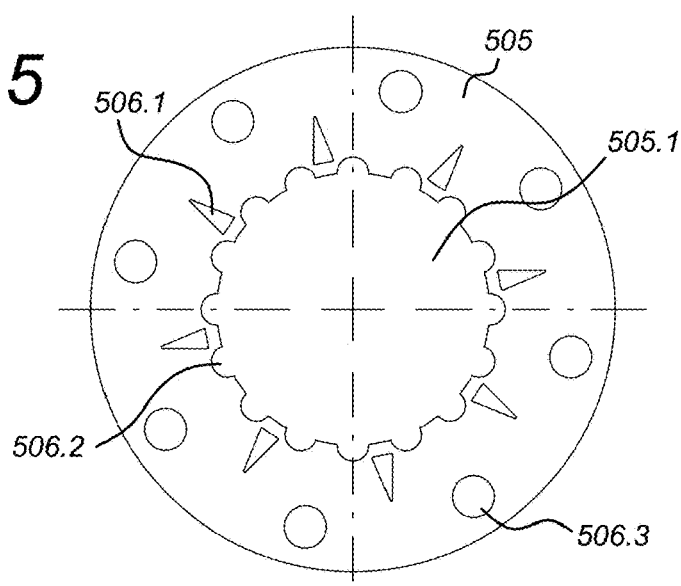
FIG. 5 shows the controlled valve plate of the embodiments of FIGS. 2 to 4.

The piston according to a first embodiment is shown in more detail and in cross-section in FIG. 2. Further details are shown in FIG. 3 to 5. A top or first side 11.1 of the piston is directed towards and associated with the first cylinder chamber 10.1, and a bottom or second side 11.2 of the piston is directed towards and associated with the second cylinder chamber 10.2.

A first main channel 301, 101 passes through the piston 11 to allow for a first main fluid flow F10 from the second side 11.2 to the first side 11.1 of the piston and therefore from the second cylinder chamber 10.2 to the first cylinder chamber 10.1. A first main non-return valve 111 is arranged at the piston first side 11.1 and is associated with the first main channel 301, 101 so as to open for fluid flow from the second cylinder chamber 10.2 through the first main channel towards the first cylinder chamber 10.1 and piston first side 11.1. The first main non-return valve 111 is closed for fluid flow in the opposite direction, although may allow for a small constant fluid flow in either direction by providing a relatively small constant opening. The first main fluid flow F10 flows through the first main channel 301, 101 upon inward movement Mi of the piston 11 within the cylinder 12. The first main fluid flow and associated inward movement of the piston is damped by the first main channel and the first main non-return valve.

In the same manner a second main channel 302, 202 passes through the piston 11 to allow for a second main fluid flow F20 from the piston first side 11.1 and first cylinder chamber 10.1 to the piston second side 11.2 and second cylinder chamber 10.2. A second main non-return valve 212 is arranged at the piston second side 11.2 and is associated with the second main channel 302, 202 so as to open for fluid flow from the first cylinder chamber 10.1 through the second main channel towards the second cylinder chamber 10.2 and piston second side 11.2. The second main non-return valve is closed for fluid flow in the opposite direction, but may also allow for a relatively small constant fluid flow in either direction by providing a constant opening. The second main fluid flow F20 flows through the second main channel 302, 202 upon outward movement Mo of the piston 11 within the cylinder 12. The second main fluid flow and associated outward movement of the piston is damped by the second main channel and the second main non-return valve.

The piston body comprises first and second central members 100, 200 and a connecting member 300, which is substantially ring shaped in the embodiment shown. The first (or top) central member 100 is received within the ring-shaped connecting member 300 at a top or first side of the connecting member, which is associated with the piston first side 11.1. The second (or bottom) central member 200 is received within the connecting member at a bottom or second side of the connecting member, which is associated with the piston second side 11.2. The connecting member 300 seals against the cylinder wall 12.1 and is shaped to move along the cylinder wall. Both central members 100, 200 leave a clearance between them and the cylinder wall.

The connecting member 300 comprises parts 301, 302 of both the first main channel and the second main channel, respectively. First main channel part 301 is in fluid connection with first main channel part 101 of the top (first) central member 100 to form the first main channel in between first and second sides 11.1, 11.2 of the piston. The part 301 of the first main channel in the connecting member has opposing ends. One end is in line with the part 101 of the first main channel in the top central member 100 and the other end is in fluid connection with the piston second side 11.2. Second main channel part 302 is in fluid connection with second main channel part 202 of the bottom (second) central member 200 to form the second main channel in between first and second sides 11.1, 11.2 of the piston. The part 302 of the second main channel in the connecting member 300 also has opposing ends. One end is in line with the part 202 of the second main channel in the bottom central member 200 and the other end is in fluid connection with the piston first side 11.1. The clearances between the central members and the cylinder wall allow fluid to flow into the first and second main channel. The respective clearances may also be regarded as a part of the first and second main channels.

Actually, the piston comprises more than one first main channel 301, 101 and more than one second main channel 302, 202 in the embodiment shown distributed around a central axis of the piston. The connecting member 300 comprises parts 301 for each first main channel and parts 302 for each second main channel. Each part 301 of each first main channel is in line with another part 101 of each first main channel comprised in the first central member 100. Correspondingly, each part 302 of each second main channel is in line with another part 202 of each second main channel comprised in the second central member 200. The connecting member, and the first and second central members are fitted, especially press-fitted into one another so as to provide a sealing fit.

The first main non-return valve 111 is provided on the top central member 100 and closes off the first main channel 301, 101. Likewise, the second main non-return valve 212 is provided on the bottom central member and closes of the second main channel 302, 202. As indicated above, one or both of the main non-return valves 111, 212 may provide for a constant opening to allow for a constant fluid flow across the respective valve in either direction. Such constant opening may, for instance, be provided in the valve or in the valve seat. One or both of the main non-return valves comprise one or more plates in the embodiment shown.

A bi-directional frequency-selective damper valve is provided between the first and second central members 100, 200 and centrally in the ring-shaped connecting member 300. The frequency-selective damper valve comprises a controlled valve assembly 500, a movable valve body 600 and two variable volume chambers 701, 702, and acts in a controlled valve channel in between the first and second cylinder chambers 10.1, 10.2. The controlled valve channel comprises first and second central member annular grooves 105, 205 in sides of the first and second central members 100, 200 associated with the second and first sides 11.2, 11.1 of the piston, respectively. The annular groove 105 in the first central member 100 is in fluid connection with the first main channel 301, 101 end therefore with the second cylinder chamber 10.2. The annular groove 205 of the second central member 200 is in fluid communication with the second main channel 302, 202 and therefore with the first cylinder chamber 10.1.

The controlled valve assembly 500 is provided in the controlled flow channel and comprises a controlled valve plate 550 clamped in between first and second movable valve body members 610, 620 of the movable valve body 600. The controlled valve plate 550 is ring shaped, and also the first and second movable valve body members 610, 620 are ring-shaped. A sleeve 650 keeps the first and second movable valve body members 610, 620 and the controlled valve plate 550 clamped together. The ring-shaped controlled valve plate 550 has a central opening and is at its inner circumference clamped between the first and second movable valve body members 610, 620. The inner circumference of controlled valve plate 550 can move up and down together with the movable valve body 600. The first and second movable valve body members comprise curved edges 611, 621 facing towards the controlled valve plate 550, the curved edges each having a curved surface. The outer circumference of the connecting controlled valve plate 550 is provided in between protrusion members 510, 520 on the wall of the controlled flow channel. The protrusion members have curved surfaces 511, 521 facing towards the controlled valve plate 550. They are clamped between the first/upper and second/lower central members 100, 200 and fitted within the connecting member so as to form a wall part of the controlled flow channel. The protrusion members 510, 520 have a ring-shaped configuration. In the embodiment of FIGS. 2 and 3 the curved surfaces 511, 512 are provided on protrusions of the protrusion members, the protrusion projecting into the controlled flow channel. In alternative embodiments the curved surfaces can be provided in another manner.

The movable valve body 600 of first and second movable valve body members 610, 620 and sleeve 650 is movable up and down in an annular space provided between first and second central members 100, 200, connecting member 300 and intermediate member 350. Intermediate member 350 is clamped in between first and second central members 100, 200 together with non-return valve plates 712, 722 (that are clamped in between first central member 100 and intermediate member 350, and intermediate member and second central member 200, respectively). An upper variable volume chamber 710 is defined between first central member 100, intermediate member 350 and movable valve body 600, especially first movable valve body member 610. An outlet opening 711 of the upper variable volume chamber 710 is defined by a clearance between first movable valve member 610 and first central member 100. The outlet opening 711 has an annular slit shape that provides for a flow restriction for a fluid flow F31 from the variable volume chamber 710 through the outlet opening 711 to the controlled flow channel. A variable volume chamber non-return valve 712 with opening 713 is provided at the top of the upper variable volume chamber. The non-return valve 712 allows for a fluid flow F11 from the space 101.1 between the first main non-return valve 111 and the first central member 100 into the upper variable volume chamber 710, but prevents a fluid flow from the upper variable volume chamber into that space 101.1.

Correspondingly, a lower variable volume chamber 720 is defined between second central member 200, intermediate member 350 and movable valve body 600, especially second movable valve body member 620. An outlet opening 721 of the lower variable volume chamber 720 is defined by a clearance between second movable valve member 620 and second central member 200. The outlet opening 721 has an annular slit shape that provides for a flow restriction for a fluid flow F32 from the variable volume chamber 720 through the outlet opening 721 to the controlled flow channel. A variable volume chamber non-return valve 722 with opening 723 is provided at the bottom of the lower variable volume chamber. The non-return valve 722 allows for a fluid flow F21 from the space 202.1 between the second main non-return valve 212 and the second central member 200 into the lower variable volume chamber 720, but prevents a fluid flow from the lower variable volume chamber into that space 202.1.

The controlled valve plate 550 is at its inner circumference clamped in between the first and second movable valve body members 610, 612 having the curved surfaces 611, 621 facing towards the controlled valve plate 550. At its outer circumference the controlled valve plate is provided, but not clamped, in between the protrusions of the protrusion members 510, 520, which have curved surfaces 511, 521 facing the controlled valve plate. The controlled valve plate has a large central opening 505.1, as shown in FIG. 5, to fit around the intermediate member 650 and allow clamping in between first and second movable valve body members. A detail showing the controlled valve plate clamped between the first and second movable valve members is shown in FIG. 4. The controlled valve plate further has openings 506.1 provided near its inner circumference, cut-out openings 506.2 at its inner circumference, and openings 506.3 near its outer circumference. The openings 506.1 and 506.2 cooperate with the curved surfaces 611, 621 of the movable valve body. Upon deformation of the controlled valve plate 550 when the movable valve body 600 moves up or down the openings 506.1 and 506.2 will be gradually closed off by the curved surfaces 621 and 611, respectively. The openings 506.3 cooperate with the curved surfaces 511, 521 of the protrusion members 510, 520. Upon deformation of the controlled valve plate 550 when the movable valve body 600 moves up or down the openings 506.3 will be gradually closed off by the curved surfaces 511 and 521, respectively. The gradual closing off of the openings 506.1, 506.2, 506.3 upon deformation of the controlled valve plate gradually shuts of a fluid flow F15, F25 past the controlled valve plate 550.

Upon outward movement Mo the piston 11 moves upwards within the cylinder 12 and fluid flows F20, F21 and F25 enter from the first/upper cylinder chamber 10.1 into the second main channel 302, 202. The main fluid flow F20 passes to the second/lower cylinder chamber 10.2 when the second main non-return valve 212 opens. A fill flow F21 passes from the space in between second central member 200 and second main non-return valve into channels 220. The fill flow F21 will open the non-return valve 722 so that fill flow F21 passes through opening 723 in the non-return valve 712 into lower variable volume chamber 720 to fill the lower variable volume chamber with fluid. Non-return valve 712 is configured such that opening 713 is normally closed, so closed in the absence of any fluid pressure on non-return valve 712. A controlled fluid flow F25 flows from first cylinder chamber 10.1 and second main channel 302, 202 into a space 205a at the first cylinder chamber side (second main channel side) of the controlled flow channel with respect to the controlled valve plate 550. The controlled fluid flow F25 may pass through the openings in the controlled flow valve plate towards the first cylinder chamber 10.1. The fluid pressures in lower variable volume chamber 720, in second main channel 302, 202, in the space 205a and in first cylinder chamber 10.1 are (about) equal. This fluid pressure acts in lower variable volume chamber 720 on a surface area A2 of the second movable valve body member 620. In space 205a this fluid pressure acts on a surface area A2-Ax of the second movable valve body member 620. The surface area Ax varies with movement of the movable valve member 600 and is dependent on the contact area of controlled valve plate 550 with second movable valve body member 620, especially with the curved surface 621 thereof. As the movable valve body moves upwards from the neutral middle position this surface area Ax becomes larger. The fluid pressure in lower variable volume chamber 720 therefore effectively acts on surface area Ax of the movable valve body 600 and the resulting force increases as the movable valve body moves upwards since the surface area Ax increases, which is a functional force transfer increase on the movable valve body with movement from the neutral position.

At the same time the controlled valve plate 550 rolls over curved surface 511 of protrusion member 510 and curved surface 621 of the second movable valve body member 620 with movement away of the movable valve body 600 from the neutral position, which decreases a functional surface area of the controlled valve plate 550 for force transfer but at the same time increases its stiffness. Both characteristics can be tuned together with other parameters, such as increase of functional force on the movable valve body 600, to achieve a desired time and therefore frequency dependent behaviour of the damping valve. The controlled valve plate further acts like a spring exerting a force onto the movable valve body 600 to move it back to its neutral position.

Space 105a of the controlled flow channel at the other side of the controlled valve plate 550 is in fluid connection with the first main channel 101, 301 and second cylinder chamber 10.2 and at (about) equal fluid pressure. Since the piston moves upwards the fluid pressure in second cylinder chamber 10.2 is considerably lower than the fluid pressure in first cylinder chamber 10.1. The fluid pressure in space 105a is thus considerably lower than the fluid pressure in space 205a with outward piston movement Mo.

At the start of the outward piston movement Mo the upper variable volume chamber 710 is filled with fluid. The fluid pressure (damping pressure) in the upper variable volume chamber acts on a surface area A1 of the first movable valve body member 610 of the movable valve body 600. Generally, the surface area A1 will be equal to the surface area A2 when the movable valve body 600 is symmetrical with respect to the controlled valve plate 550, as is the case in the embodiment shown in FIGS. 2 and 3. The resulting force by the fluid pressure in upper variable volume chamber 710 is directed downwards and counteracts the upward force on the movable valve body by the fluid pressure in the lower variable volume chamber 720. A fluid flow F31 can escape from the upper variable volume chamber through the outlet opening 711 of the upper variable volume chamber. The outlet opening 711 is formed by a slit in between first/upper movable valve body member 610 and first/upper central member 100. The slit also presents a flow restriction to the fluid flow F31 from the upper variable volume chamber 710.

Fluid can only escape from the upper variable volume chamber through outlet opening 711 that is in fluid connection with the controlled flow channel downstream of the controlled valve assembly with controlled valve plate 550 with respect to the controlled fluid flow F25 from upper/first cylinder chamber 10.1 to lower/second cylinder chamber 10.2. The non-return valve 712 with its opening 713 is closed for fluid flow from the upper variable volume chamber. The fluid pressure within upper variable volume chamber acts to close the non-return valve 712. The fluid pressure within upper variable volume chamber 710 and the fluid flow F31 act to damp the upward movement of the movable valve member 600. Fluid flow F31 can therefore be referred to as a damping fluid flow.

The controlled fluid flow F25 is in parallel to the flow path of the second main fluid flow F20 upon outward movement Mo. The speed and therefore the time required for closure of the openings of the controlled valve plate 550 and therefore of the controlled valve assembly 500 determine the frequency-dependency of the damper valve. The frequency-selective gradual closing of the controlled valve assembly provides a frequency-selective damping of the controlled fluid flow and therefore of the piston movement with respect to the cylinder. One may like to have a proportional relationship between pressure increase in the upper variable volume chamber 710 and displacement of the movable valve body 600. The fluid pressure increase in the upper variable volume chamber is non-linear. This can be largely compensated by the change in effective surface area Ax on which the fluid pressure upstream of the controlled valve assembly 500 (in the lower variable volume chamber 720) acts. The curvatures and radiuses of the curved surfaces 511, 621 can be designed for obtaining a proportional relationship. One may further design the number, position, shape and size of the openings in the controlled valve plate 550 for that purpose. A number of variables is therefore available to obtain a desired damping behaviour. The openings 506.1, 506.2 and 506.3 shown in FIG. 5 are only one example. The openings 506.1 allow for a fluid flow F25.1 that will be reduced as opening 506.1 will be gradually closed off upon displacement of the movable valve body. Cut-out openings 506.2 cooperate with annular chambers in the first and second movable valve body members 610, 620 as shown in FIG. 4 allow for a fluid flow F25.2 at a high frequent pressure increase.

The frequency-selective damper valve shown in FIGS. 2, 3, 4 and 5 acts bi-directional, so also at inward movement Mi of the piston 11. At inward movement a first main fluid flow F10 passes from the second cylinder chamber 10.2 to the first cylinder chamber through the first main channel when the first main non-return valve 111 opens. A fill fluid flow F11 will fill the upper variable volume chamber by passing opening 713 in non-return valve 712 and a controlled fluid flow F15 passes through the controlled flow channel from the second cylinder chamber to the first cylinder chamber when the controlled valve assembly 500 is not (yet) closed. A damping fluid flow F32 passes from the lower variable volume chamber 720 to what now is the downstream side of the controlled valve assembly with respect to the controlled fluid flow F15.

Figure 6:
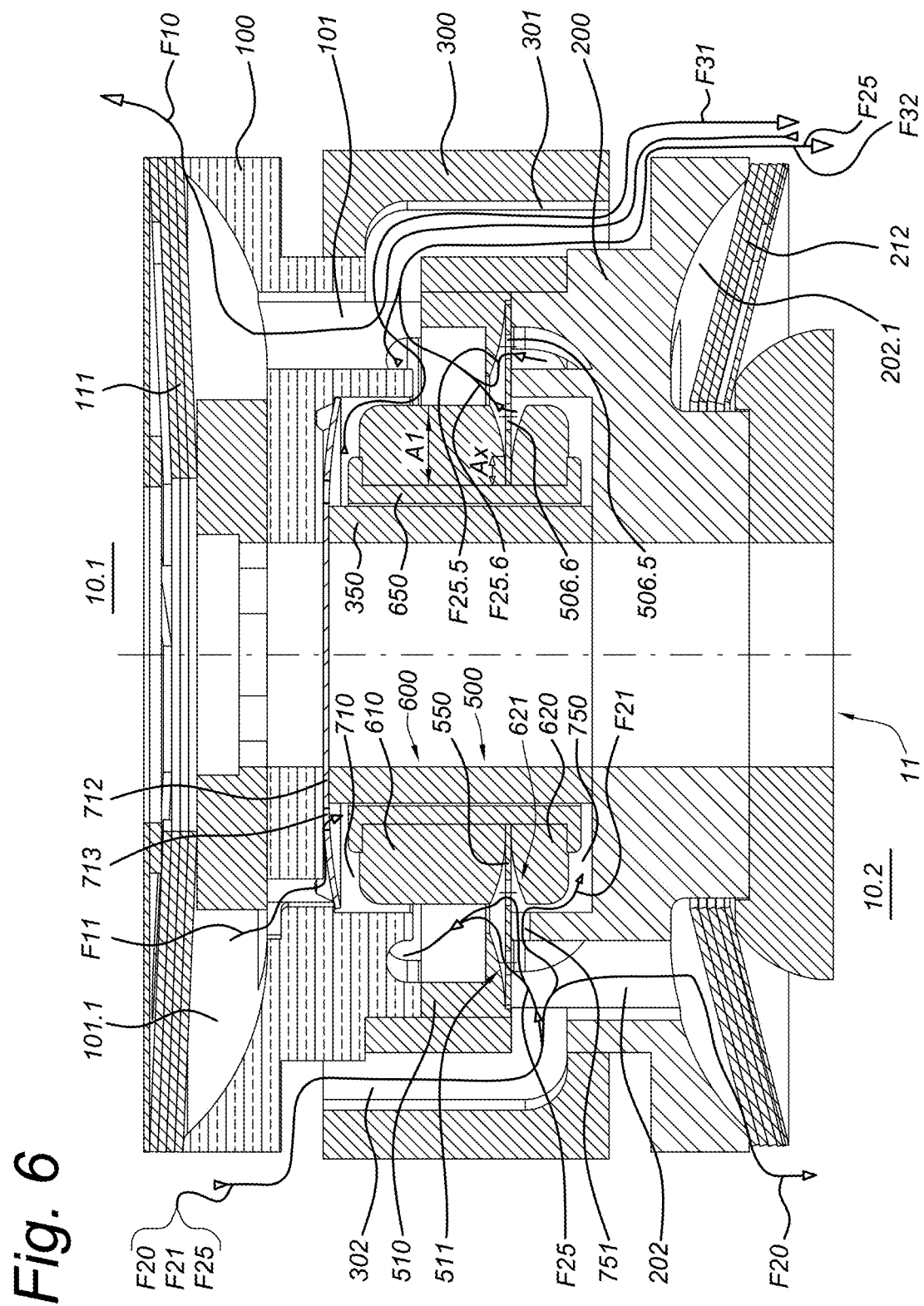
FIG. 6 shows a second embodiment of the piston of the shock absorber of FIG. 1, the piston comprising another embodiment of a frequency-selective damper valve according to the invention.

FIG. 6 shows another embodiment of a piston having a frequency-selective damper valve. The frequency selective damper valve of the FIG. 6 embodiment only acts in one direction, being the outward direction Mo. The various elements, parts and flows are largely identical as has been described with reference to the FIGS. 2, 3, 4 and 5 for the outward movement of the bi-directional frequency-selective damper. However, the one-directional embodiment of FIG. 6 does not have a lower variable volume chamber. Instead a space 750 is provided below the movable valve body 600, which space 750 is in open fluid connection with the second main channel 302, 202, the space 202.1 between second central member 200 and second main non-return valve 212, and first/upper cylinder chamber 10.1 via passage 751. The passage 751 is provided in between second main channel part 202 and space 750 and between annular groove 205 and space 750 in the embodiment shown. The clearance between second/lower movable valve body member 620 is such that it does not present a flow restriction to fluid flow between channel 751 and space 750. Upon inward movement the fill flow F11 acts to reset upper/first variable volume chamber 710 to allow frequency-selective damping at a next outward movement of the piston.

Figure 7:
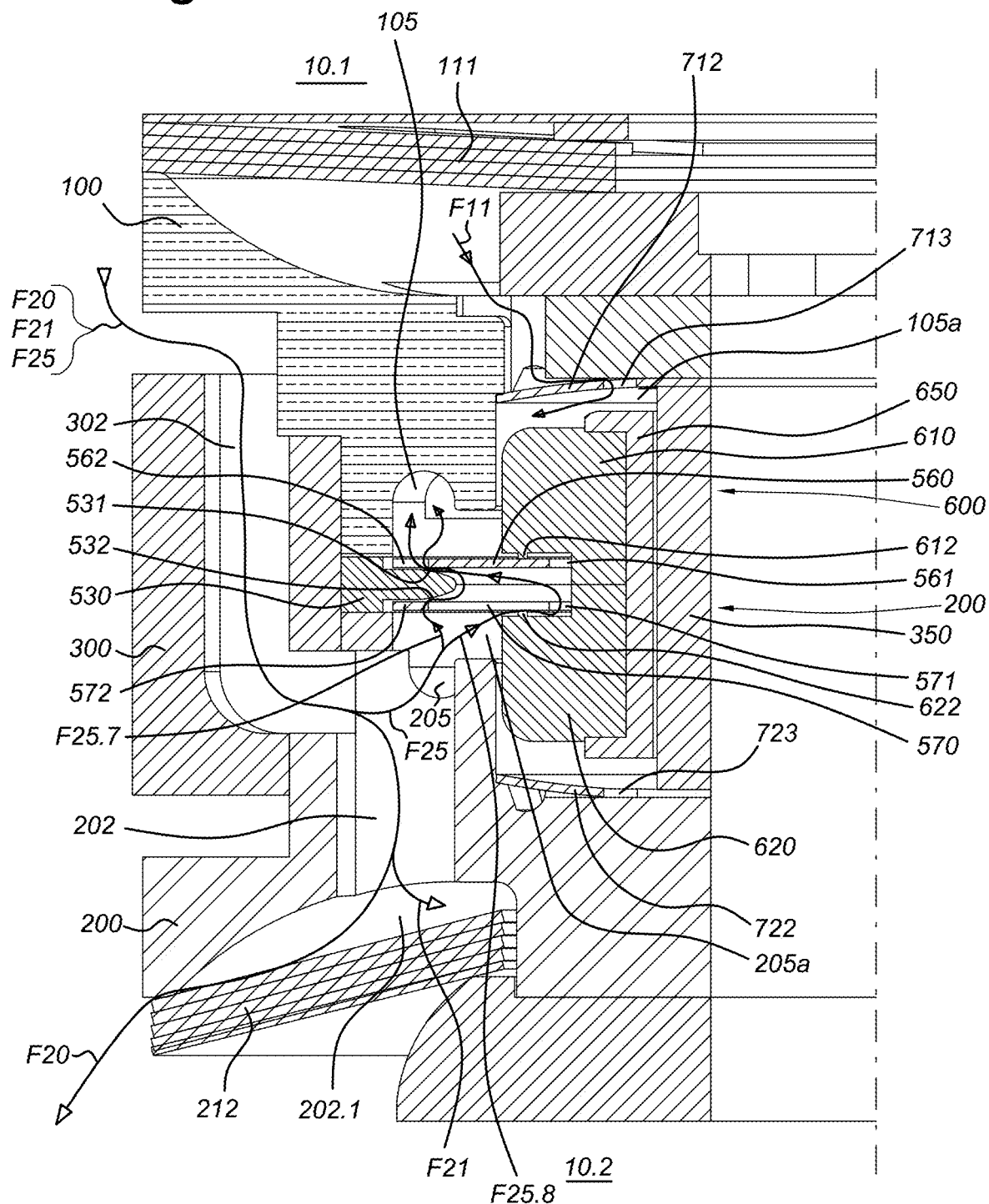
FIG. 7 shows a detail of a third embodiment of the piston of the shock absorber of FIG. 1, the piston comprising yet another embodiment of a frequency-selective damper valve according to the invention.

Yet another embodiment is shown in FIG. 7. FIG. 7 also depicts a bidirectional frequency-selective valve inside piston 1. Parts and elements having the same reference signs as parts and elements disclosed with reference to FIGS. 2-6 have the same function as already disclosed. The controlled valve assembly shown in FIG. 7 comprises second and third valve plates 560, 570 acting on the one hand as non-return valve closing on valve seats 612, 622 of first and second movable valve body members 610, 620, respectively. The first and second controlled valve plates 560, 570 have inner slits 561, 571 at their inner circumference and outer slits 562, 572 at their outer circumference, respectively. The inner slits 561, 571 allow a fluid flow to pass the valve plates when lifted from their respective valve seat and further allow centering the valve plates on the movable valve body 600. At their outer circumference the first and second controlled valve plates 560, 570 rest against curved surfaces 531, 532, respectively, of protrusion member 530 that is part of the wall of the controlled flow channel 302, 202, 205, 205a, 105a, 105, 101, 301. Upon outward movement Mo of the piston controlled fluid flow F25 can pass the controlled valve assembly in two sub flows F25.7, F25.8. Sub flow F25.7 passes through slits 572 of third valve plate 570 and subsequently through slits 562 of second valve plate 560. The slits 572 are gradually closed off against curved surface 532 of protrusion member 530 as movable valve body 600 moves upwards. Second valve plate 560 then moves away from curved surface 531 so that slits 562 remain open to allow passing of any sub flow of controlled fluid flow F25. Another sub flow F25.8 may lift the third valve plate 570 from its valve seat 622 and pass the third vale plate across valve seat 622 and through outer valve plate slits 571. Subsequently, sub flow F25.8 passes through outer slits 562 of the second/upper valve plate 560 into space 105a and annular groove 105 and further towards lower/second cylinder chamber 10.2. The pretension on third valve plate increases as movable valve body 600 moves upwards, as has been described earlier with reference to FIGS. 2-5. The characteristics of the damping behaviour of the valve plates is determined by the thickness and material of the valve plates, the curvature of the curved surfaces 531, 532, a pretension on the valve plates in the neutral position, etc. A desired behaviour can be obtained by careful design of the controlled valve assembly 500. Upon inward movement Mi of the piston the fluid flows and function of the second and third valve plates is inverted. The effective surfaces of the movable valve body 600 on which the fluid flow upstream of the controlled valve assembly acts are static in the FIG. 7 embodiment, meaning that they remain constant with movement of the movable valve body.

Figure 8:
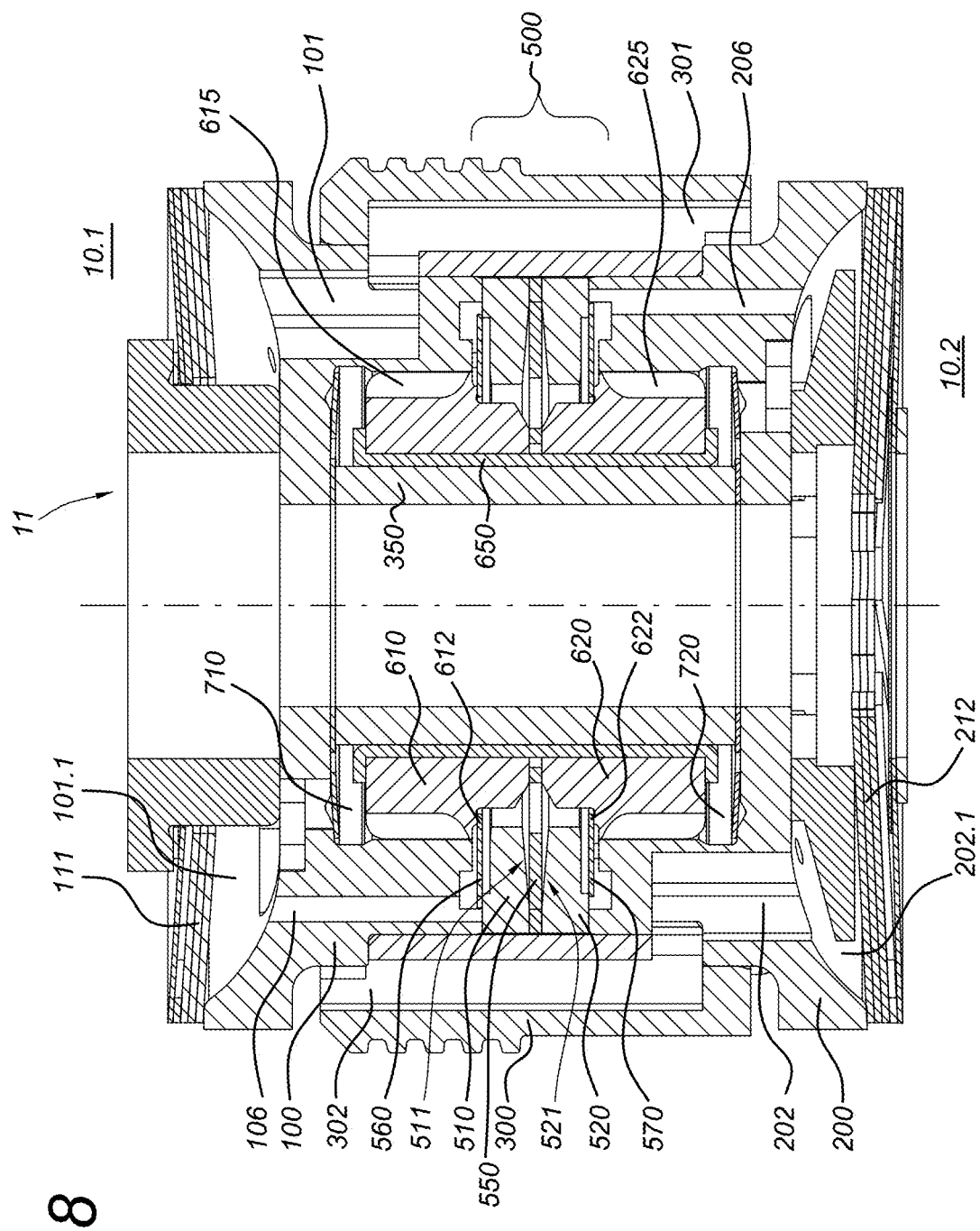
FIG. 8 shows a fourth embodiment of the piston of the shock absorber of FIG. 1, the piston comprising yet another embodiment of a frequency-selective damper valve according to the invention.

FIG. 8 shows yet another embodiment of a frequency-selective damping valve in a piston 11. The embodiment of FIG. 8 combines the embodiments of FIGS. 2 and 7, providing an increased number of design parameters to tune the frequency-selective damping behaviour of the valve. The embodiment comprises first and second controlled valve plates 560, 570 embodied as non-return valves and a third controlled valve plate 550. The third controlled valve plate 550 comprises openings and cooperates with curved surfaces as described earlier. The internal and external perimeters of the ring-shaped controlled valve plate 550 are restricted in their movement by the movable valve body 600 and the wall of the controlled flow channel, respectively. The internal perimeter is clamped between first and second members 610, 620 of the movable valve body. The third controlled valve plate comprises a chosen stiffness and acts like a spring exerting a force onto the movable valve body 600 to move it back to its neutral position.

The first and second movable valve body members 610, 620 in this embodiment additionally comprise reset slits 615, 625 extending from the corresponding variable volume chambers 710, 720 towards the controlled valve assembly 500. The reset slits 615, 625 do not extend over the full available height of the members 610, 620 so as to still provide a flow resistance for fluid flow from the corresponding variable volume chambers 710, 720, respectively. The reset slits allow a fast movement back towards the neutral position of the controlled valve assembly when the piston reverses its movement from inwards to outwards or vice versa. Fluid can easily escape from a variable volume chamber through the reset slits after having been filled by a respective fill flow F11, F21.

The embodiment of FIG. 8 further comprises various stepped and curved surfaces cooperating with the three valve plates 550, 560, 570 and their openings to achieve a desired frequency-dependent damping behaviour. The controlled flow channel comprises channel parts 106, 206 connecting to the spaces 101.1, 202.1 in between first/upper central member 100 and first main non-return valve 111, and second/lower central member 200 and second main non-return valve 212, respectively, which spaces are in fluid connection with the first main channel 301, 101 and second main channel 302, 202, respectively.

A very important parameter to maintain a desired frequency-dependency is the preload generated on the first and second controlled valves 560, 570. The functional surface areas of these valves in relation to the pressure upstream of the controlled valve assembly results in a displacement of the first and second controlled valves 560, 570 at their circumference associated with the respective valve seats 612, 622. The fluid pressure upstream of the controlled valve assembly results in a displacement of the movable valve body 600 and its valve seats 612, 622, which is further governed by the stiffness of a respective controlled valve plate 560, 570 and the damping pressure in a variable volume chamber. The displacement of the movable valve body in an equilibrium position is predominantly given by the fluid pressure upstream of the controlled valve assembly and the stiffness of the respective controlled valve plate, which displacement should be equal or even larger than the displacement of the respective controlled valve plate to result in closure of that valve plate on its associated valve seat. In such equilibrium position there should be a positive preload on the respective controlled valve plate 560, 570 in the order of, for instance, 0 to 50 N. At a next pressure pulse upstream of the controlled valve assembly the respective controlled valve plate 560, 570 will open from its valve seat. A corresponding displacement of the movable valve body is damped by a damping pressure in the respective variable volume chamber and will therefore lag behind a displacement of the controlled valve plate, during which fluid passes the controlled valve assembly through the controlled valve channel. In an next equilibrium position the respective controlled valve plate 560, 570 will close again on its associated valve seat 612, 622. The embodiment of FIG. 8 has element providing a degressive behaviour to the damping valve and elements providing progressive behaviour to the damping valve. By careful tuning of the various parameters available in the design one can obtain a desired damping behaviour of the damping valve.

The bidirectional frequency-selective valve in the embodiments shown is configured symmetric for the inward and outward directions, but may generally also be configured asymmetrically. The valve plates of the controlled valve assembly may further be clamped or not, as would be desirable in a specific configuration to reach a required damping behaviour.

Figure 9:
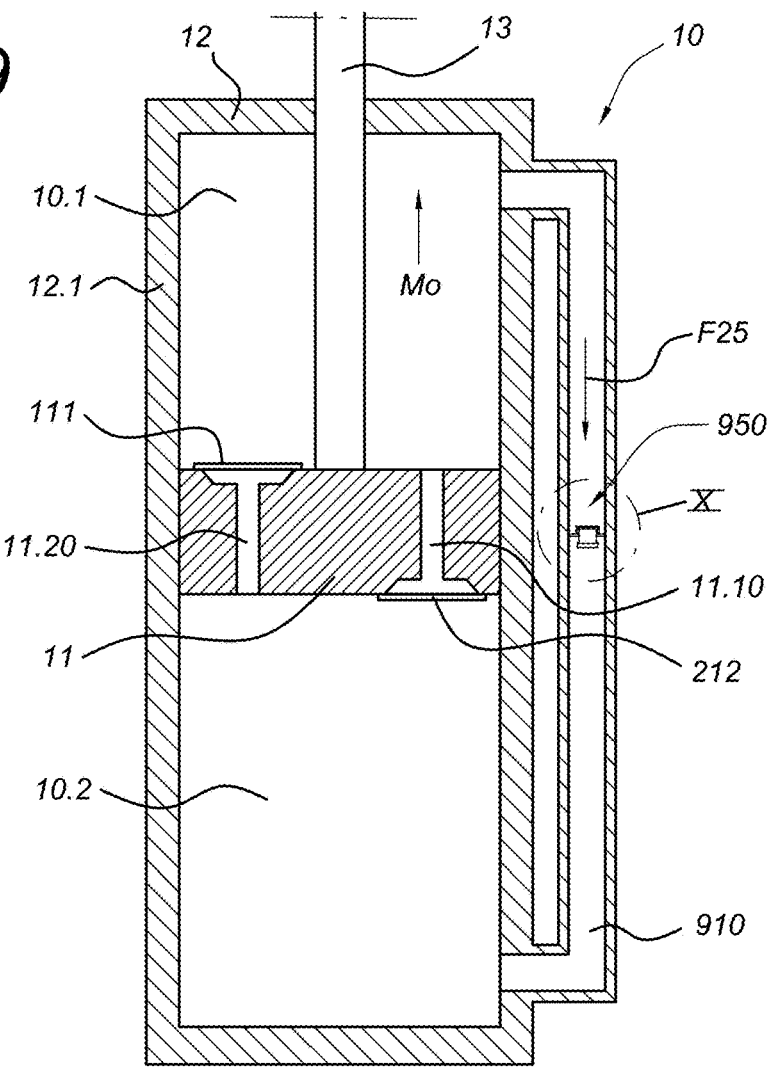
FIG. 9 shows another embodiment of a damper (shock absorber) according to the invention.
Figure 11:
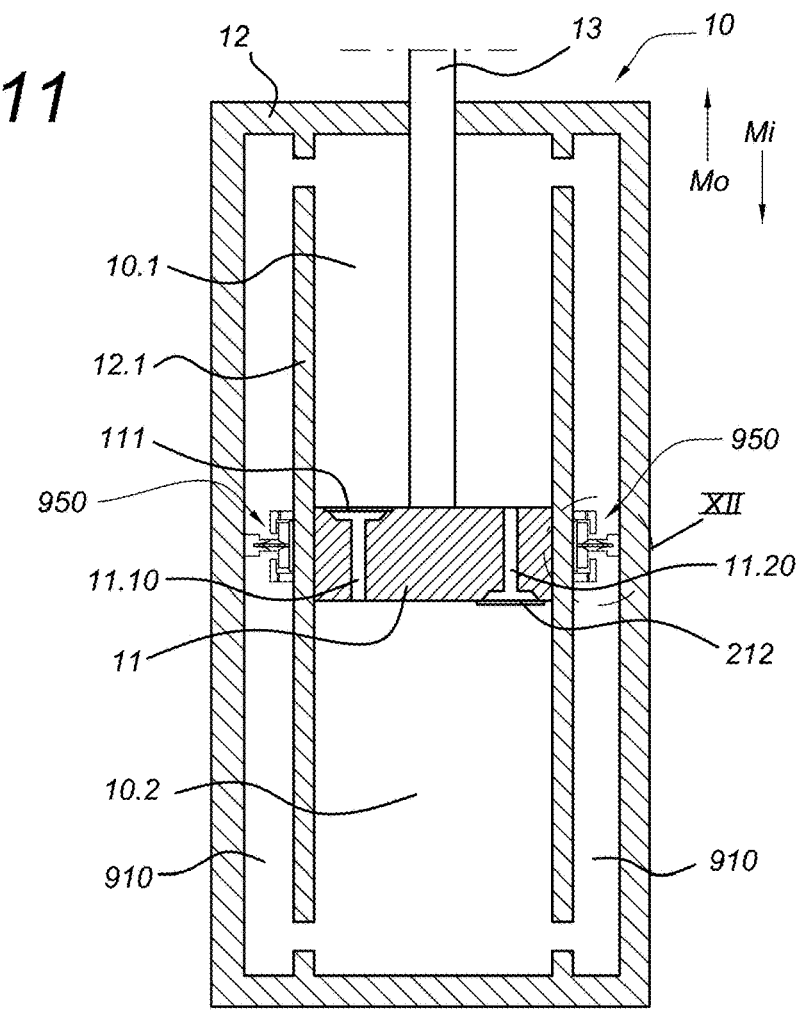
FIG. 11 shows yet another embodiment of a damper (shock absorber) according to the invention.

Above the frequency-selective damping valves have been described as being integrated in the piston 11. However, the frequency-selective (frequency-dependent) damping valves can also be connected in another configuration between two chambers for damping a fluid flow between these chambers. FIGS. 9 and 11 show some two other embodiments in a schematic manner. These embodiments have a piston 11 dividing a cylinder 12 in first and second cylinder chambers 10.1, 10.2. A first main channel 11.10 and associated first main non-return valve 111 allow for a first main fluid flow from the second to the first cylinder chamber at inward movement of the piston. A second main channel 11.20 and associated second main non-return valve 212 allow for a second main fluid flow at outward movement of the piston. Functioning and damping by the main channels 11.10, 11.20 and main non-return valves 111, 212 is similar as has been described earlier.

Figure 10:
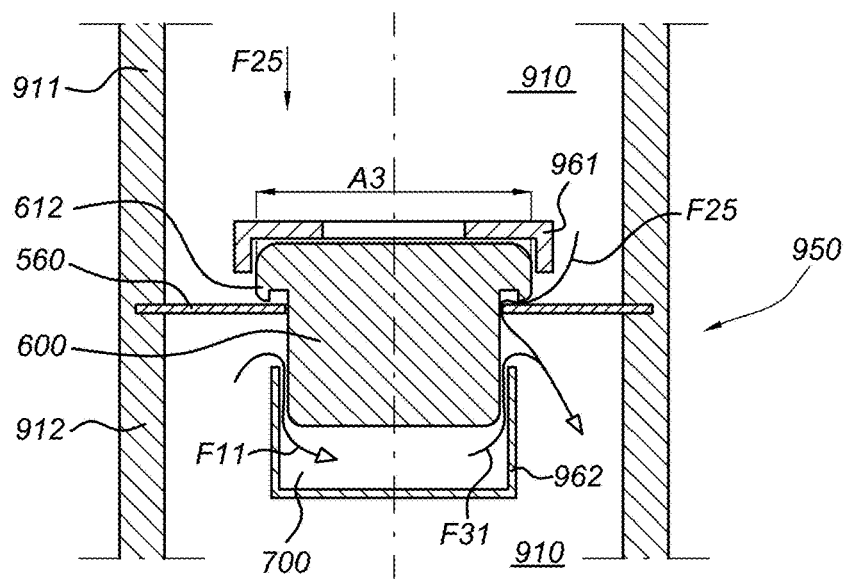
FIG. 10 shows an embodiment of a frequency-selective damper valve of FIG. 9 in more detail.

FIG. 9 shows a damper having a tube-like channel 910 connecting the upper and lower cylinder chambers 10.1, 10.2 of damper 10. The frequency-selective damping valve 950 has rotational symmetry around a vertical axis and is arranged in this tube-like channel, and shown in more detail in FIG. 10. FIGS. 9 and 10 shows controlled fluid flow F25 for an outward movement Mo of the piston. The frequency-selective damper valve is one-directional non-return type of valve and acts for the outward movement only. A fluid pressure upstream of the damper valve 950 acts on a surface area A3 of movable valve body to provide a downward directed pressure. The downward directed force is counteracted by a fluid pressure inside variable volume chamber 700 and acting upwards on the movable valve member. A damping fluid flow F31 escapes from variable volume chamber 700 through the slit in between movable valve member and lower housing part 962 for the movable valve member. The slit provides an outlet opening with flow restriction for the variable volume chamber. With the escape of fluid from the variable volume chamber the movable valve member 600 moves downwards to provide an increased pretensioning force on the valve plate 600. Ring-shaped valve plate 600 is clamped in between wall parts 911, 912 of the controlled flow channel 910 and closes on valve seat 612 on the movable valve member. A top housing part 961 is provided above the movable valve body 600 to restrict an upward movement of the movable valve body. At inward movement of the piston an upward force will be exerted on the valve plate 560 and movable valve body. A fill or reset fluid flow F11 will enter the variable volume chamber to allow the movable valve body 600 to move upwards against upper housing part 961 in a neutral position again. In the neutral position no or only a small pretensioning force is exerted by the movable valve member 600 on the valve plate 560.

Figure 12:
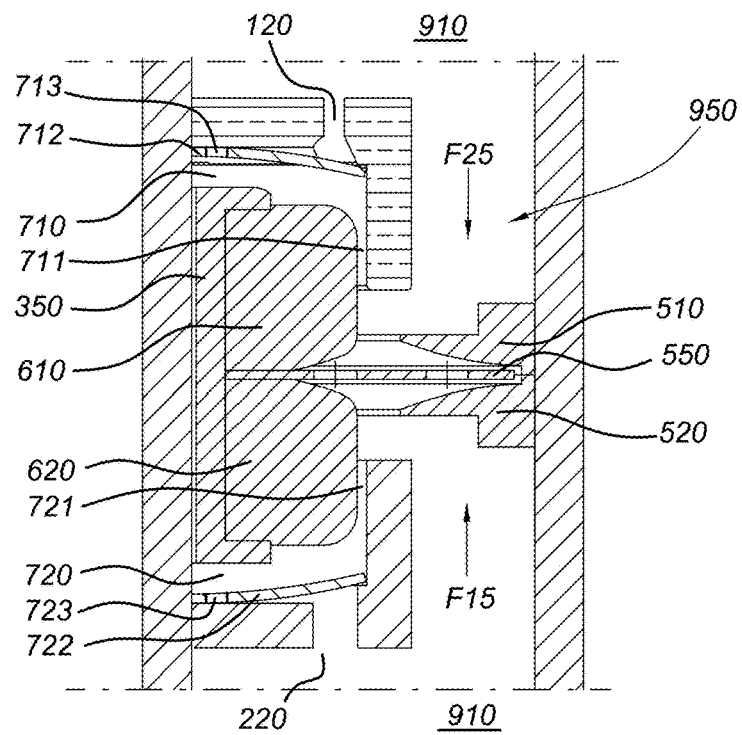
FIG. 12 shows an embodiment of a frequency-selective damper valve of FIG. 11 in more detail.

FIG. 11 shows an annular type of channel 910 arranged around the upper and lower cylinder chambers 10.1, 10.2 of damper 10. A frequency-selective damping valve 950 is arranged in channel 910, and shown in more detail in FIG. 12. The frequency-selective damping valve 950 has a ring-like configuration going around the cylinder chambers 10.1, 10.2. Only the part of the frequency-selective damping valve shown on the right-hand side of FIG. 11 is depicted in detail in FIG. 12. The frequency-selective damping valve of FIGS. 11 and 12 is basically the same as the one shown in and described with reference to FIG. 2.

The invention claimed is:

1. A frequency-selective damper valve comprising:
a controlled flow channel arranged to provide a fluid connection between a first damper valve side and a second damper valve side of the damper valve;
a controlled valve assembly provided in the controlled flow channel to allow, in operation, influencing a controlled fluid flow in the controlled flow channel in a controlled flow direction from the first damper valve side to the second damper valve side;
a movable valve body being movable with respect to a wall of the controlled flow channel and acting on the controlled valve assembly to allow changing a flow resistance for the controlled fluid flow by the controlled valve assembly;
a first central member and an intermediate member; and
a variable volume chamber defined by the movable valve body, the first central member and the intermediate member, the movable valve body interacting with the variable volume chamber such that movement of the movable valve body and a change in volume of the variable volume chamber are interrelated, wherein the variable volume chamber comprises:
an outlet opening, in operation, downstream of the controlled valve assembly and does not comprise an opening upstream of the controlled valve assembly with respect to the controlled fluid flow in the controlled flow channel, the outlet opening providing a flow resistance,
a fluid pressure upstream of the controlled valve assembly with respect to the controlled fluid flow acting on the movable valve body to induce a force on the movable valve member in a direction to increase a fluid pressure in the variable volume chamber and to decrease a volume of the variable volume chamber by fluid flow from the variable volume chamber through the outlet opening, which allows an interrelated movement of the movable valve body, and
a non-return valve associated with an opening of the variable volume chamber downstream of the controlled valve assembly, the non-return valve being configured to be closed upon the controlled fluid flow and opening at a fluid flow in a direction opposite to the controlled fluid flow.

2. The damper valve according to claim 1, wherein the controlled valve assembly is configured such that at least one of an effective opening and a closing force of the controlled valve assembly is changed upon movement of the movable valve body to change the flow resistance for the controlled fluid flow by the controlled valve assembly.

3. The damper valve according to claim 1, wherein the controlled valve assembly is configured such that the flow resistance for the controlled fluid flow by the controlled valve assembly increases with decreasing volume of the variable volume chamber.

4. The damper valve according to claim 1, wherein the controlled valve assembly is configured to have spring-like behavior and to exert a force on the movable valve body in a direction to move the movable valve body back to a neutral position when the movable valve body has moved from the neutral position.

5. The damper valve according to claim 1, wherein the controlled valve assembly comprises a ring-shaped controlled valve plate.

6. The damper valve according to claim 1, wherein the controlled valve plate comprises opposing edges opposing internal and external perimeters of a ring-shaped controlled valve plate, one or both opposing edges being restricted in movement with respect to one or both of a wall of the controlled flow channel and the movable valve body, one or both opposing edges being clamped by one or both of a wall of the controlled flow channel and the movable valve body.

7. The damper valve according to claim 1, wherein the controlled valve assembly comprises a stack of at least one controlled valve plate interacting with at least one surface presenting a curvature upon movement of the movable valve body with decreasing volume of the variable volume chamber, and the stack of at least one controlled valve plate upon deformation conforms to the curvature to gradually decrease an effective surface area of the controlled valve plate in the controlled flow channel.

8. The damper valve according to the claim 7, wherein the stack of at least one controlled valve plate comprises at least one opening.

9. The damper valve according to claim 8, wherein the stack of at least one controlled valve plate comprises at least one opening positioned and configured to gradually close against the at least one curved surface upon movement of the movable valve body with decreasing volume of the variable volume chamber.

10. The damper valve according to claim 7, wherein the movable valve body comprises a surface presenting a curvature interacting with the controlled valve plate.

11. The damper valve according to claim 7, wherein the movable valve body comprises first and second movable valve body members, and the controlled valve plate is clamped between the first and second movable valve body members, at least one of the first and second movable valve members comprising a surface presenting a curvature interacting with the controlled valve plate.

12. The damper valve according to claim 7, wherein the wall of the controlled flow channel comprises a surface presenting a curvature interacting with the first valve plate.

13. The damper valve according to claim 1, wherein the controlled valve assembly comprises a stack of at least one controlled valve plate closing against a valve seat and of which a closing force against the valve seat changes upon movement of the movable valve body, the valve seat being provided on the movable valve body and the stack of at least one controlled valve plate being fixed with respect to the wall of the controlled flow channel.

14. The damper valve according to claim 1, wherein the controlled valve assembly is bidirectional acting for first and second flows in opposite directions in the controlled flow channel, and comprises first and second controlled valve plates associated with the first and second flows, respectively, each of the first and second controlled valve plates closing against a respective valve seat and of which a closing force against the respective valve seat changes upon movement of the movable valve body, the respective valve seats being provided on the movable valve body and the first and second controlled valve plates being fixed with respect to the wall of the controlled flow channel.

15. The damper valve according to claim 14, wherein the controlled valve assembly comprises a third controlled valve plate configured to have spring-like behavior and to exert a force on the movable valve body in a direction to move the movable valve body back to a neutral position when the movable valve body has moved from the neutral position, the third controlled valve plate being arranged in between the first and second controlled valve plates.

16. A shock absorber comprising:
a frequency-selective damper valve comprising:
    a controlled flow channel arranged to provide a fluid connection between a first damper valve side and a second damper valve side of the damper valve;
    a controlled valve assembly provided in the controlled flow channel to allow, in operation, influencing a controlled fluid flow in the controlled flow channel in a controlled flow direction from the first damper valve side to the second damper valve side;
    a movable valve body being movable with respect to a wall of the controlled flow channel and acting on the controlled valve assembly to allow changing a flow resistance for the controlled fluid flow by the controlled valve assembly;
    a first central member and an intermediate member; and
    a variable volume chamber defined by the movable valve body, the first central member and the intermediate member, the movable valve body interacting with the variable volume chamber such that movement of the movable valve body and a change in volume of the variable volume chamber are interrelated, wherein the variable volume chamber comprises:
        an outlet opening, in operation, downstream of the controlled valve assembly and does not comprise an opening upstream of the controlled valve assembly with respect to the controlled fluid flow in the controlled flow channel, the outlet opening providing a flow resistance,
        a fluid pressure upstream of the controlled valve assembly with respect to the controlled fluid flow acting on the movable valve body to induce a force on the movable valve member in a direction to increase a fluid pressure in the variable volume chamber and to decrease a volume of the variable volume chamber by fluid flow from the variable volume chamber through the outlet opening, which allows an interrelated movement of the movable valve body, and
        a non-return valve associated with an opening of the variable volume chamber downstream of the controlled valve assembly, the non-return valve being configured to be closed upon the controlled fluid flow and opening at a fluid flow in a direction opposite to the controlled fluid flow.

17. The shock absorber according to claim 16, further comprising:
a cylinder having a cylinder wall;
a piston sealing against the cylinder wall and dividing the cylinder in first and second cylinder chambers, the piston being movable within the cylinder along the cylinder wall and along a longitudinal direction of the piston and the cylinder in inward and outward directions (Mi, Mo) upon inward and outward movement, respectively, of the piston inside the cylinder, a first side of the piston being associated with the first cylinder chamber and a second side of the piston being associated with the second cylinder chamber;
a first main channel and a first main non-return valve associated with the first main channel such that the first main channel and first main valve allow and damp a first main fluid flow from the second to the first cylinder chamber; and
a second main channel and a second main non-return valve associated with the second main channel such that the second main channel and second main valve allow and damp a second main fluid flow from the first to the second cylinder chamber, wherein the first damper valve side is in direct fluid connection with one of the first and second cylinder chambers, and the second damper valve side is in direct fluid connection with the other one of the first and second cylinder chambers, the damper valve being arranged in the piston.

18. The shock absorber according to claim 17, wherein the damper valve is arranged in the piston and the piston comprises:
a ring-shaped connecting member;
a first central member received in the connecting member at a first side of the connecting member, which is transverse to the longitudinal direction of the piston and associated with the first side of the piston, a first central member channel being provided on a side of the first central member, which is transverse to the longitudinal direction of the piston and associated with the second side of the piston, the first central member channel being in fluid communication with the second side of the piston; and
a second central member received in the connecting member at a second side of the connecting member, which is transverse to the longitudinal direction of the piston and associated with the second side of the piston, a second central member channel being provided on a side of the second central member, which is transverse to the longitudinal direction of the piston and associated with the first side of the piston, the second central member channel being in fluid communication with the first side of the piston, and
wherein the controlled flow channel comprises the first and second central member channels and the controlled valve assembly and the movable valve body are provided in between the first and second central member channels.

19. The shock absorber according to claim 18, wherein
the connecting member comprises a part of the first main channel and a part of the second main channel,
the first central member comprises another part of the first main channel such that the parts of the first main channel in the connecting member and the first central member are in line, and
the second central member comprises another part of the second main channel such that the parts of the second main channel in the connecting member and the second central member are in line.

20. The shock absorber according to claim 19, wherein the connecting member is configured for movement along and sealing against the cylinder wall.

21. The shock absorber according to claim 19, wherein the first main non-return valve is provided on the first central member.

22. The shock absorber according to claim 19, wherein the second main non-return valve is provided on the second central member.

23. The shock absorber according to claim 19, wherein the part of the first main channel in the connecting member has two ends, one end being in line with the part of the first main channel in the first central member and the other end being in direct fluid connection with the second side of the piston.

24. The shock absorber according to claim 19, wherein the part of the second main channel in the connecting member has two ends, one end being in line with the part of the second main channel in the second central member and the other end being in direct fluid connection with the first side of the piston.

25. The shock absorber according to claim 18, wherein the first central member channel comprises a first central member groove provided at the side of the first central member associated with the second side of the piston.

26. The shock absorber according to claim 18, wherein the second central member channel comprises a second central member groove provided at the side of the second central member associated with the first side of the piston.

27. The shock absorber according to claim 18, wherein the first central member channel is in fluid connection with the part (101) of the first main channel in the first central member, a first auxiliary channel being provided in the first central member, which extends from the first central member channel to a side of the first central member opposing the side comprising the first central member channel, so to provide for a fluid connection between the first central member channel and the part of the first main channel in the first central member.

28. The shock absorber according to claim 18, wherein the second central member channel is in fluid connection with the part of the second main channel in the second central member, especially a second auxiliary channel being provided in the second central member which extends from the second central member channel to a side of the second central member opposing the side comprising the second central member channel, so to provide for a fluid connection between the second central member channel and the part of the second main channel in the second central member.

29. The shock absorber according to claim 18, wherein the connecting member comprises one of a slot and projection at its internal perimeter, and at least one of the first and second central members comprises the other one of the projection and the slot at its external perimeter, the slot and projection being configured to cooperate to align the connecting member and the at least one of the first and second central members with respect to one another.

30. The shock absorber according to claim 18, wherein the connecting member and at least one of the first and second central members are fitted into one another to provide a sealing fit.

31. The shock absorber according to claim 18, wherein the piston comprises more than one first main channel, the connecting member comprising a part of each first main channel in line with another part of each first main channel comprised in the first central member.

32. The shock absorber according to claim 18, wherein the piston comprises more than one second main channel, the connecting member comprising a part of each second main channel in line with another part of each second main channel comprised in the second central member.

33. The shock absorber according to claim 31, wherein the parts of the first and second main channels in the connecting member are provided alternately in the connecting member.

34. The shock absorber according to claim 18, wherein one of the first and second central members and the movable valve body provide walls of the variable volume chamber.

35. A piston for use in a shock absorber, wherein the shock absorber comprises:
a frequency-selective damper valve comprising:
a controlled flow channel arranged to provide a fluid connection between a first damper valve side and a second damper valve side of the damper valve;
a controlled valve assembly provided in the controlled flow channel to allow, in operation, influencing a controlled fluid flow in the controlled flow channel in a controlled flow direction from the first damper valve side to the second damper valve side;
a movable valve body being movable with respect to a wall of the controlled flow channel and acting on the controlled valve assembly to allow changing a flow resistance for the controlled fluid flow by the controlled valve assembly;
a first central member and an intermediate member; and
a variable volume chamber defined by the movable valve body, the first central member and the intermediate member, the movable valve body interacting with the variable volume chamber such that movement of the movable valve body and a change in volume of the variable volume chamber are interrelated, wherein the variable volume chamber comprises:
an outlet opening, in operation, downstream of the controlled valve assembly and does not comprise an opening upstream of the controlled valve assembly with respect to the controlled fluid flow in the controlled flow channel, the outlet opening providing a flow resistance, and
a fluid pressure upstream of the controlled valve assembly with respect to the controlled fluid flow acting on the movable valve body to induce a force on the movable valve member in a direction to increase a fluid pressure in the variable volume chamber and to decrease a volume of the variable volume chamber by fluid flow from the variable volume chamber through the outlet opening, which allows an interrelated movement of the movable valve body;
the piston comprises:
a ring-shaped connecting member;
a first central member received in the connecting member at a first side of the connecting member, which is transverse to the longitudinal direction of the piston and associated with the first side of the piston, a first central member channel being provided on a side of the first central member, which is transverse to the longitudinal direction of the piston and associated with the second side of the piston, the first central member channel being in fluid communication with the second side of the piston; and
a second central member received in the connecting member at a second side of the connecting member, which is transverse to the longitudinal direction of the piston and associated with the second side of the piston, a second central member channel being provided on a side of the second central member, which is transverse to the longitudinal direction of the piston and associated with the first side of the piston, the second central member channel being in fluid communication with the first side of the piston, wherein the controlled flow channel comprises the first and second central member channels and the controlled valve and the movable valve body are provided in between the first and second central member channels.

36. The piston according to claim 35, wherein the connecting member comprises a part of the first main channel and a part of the second main channel, the first central member comprises another part of the first main channel such that the parts of the first main channel in the connecting member and the first central member are in line, and the second central member comprises another part of the second main channel such that the parts of the second main channel in the connecting member and the second central member are in line.

* * * * *